United States Patent
Morosawa

(10) Patent No.: US 10,060,163 B2
(45) Date of Patent: Aug. 28, 2018

(54) DOOR LOCK SYSTEM

(71) Applicant: HONDA MOTOR CO., LTD., Tokyo (JP)

(72) Inventor: Ryo Morosawa, Wako-shi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 14/851,609

(22) Filed: Sep. 11, 2015

(65) Prior Publication Data

US 2016/0076278 A1   Mar. 17, 2016

(30) Foreign Application Priority Data

Sep. 12, 2014  (JP) .................................. 2014-185935

(51) Int. Cl.
| | |
|---|---|
| *B60L 1/00* | (2006.01) |
| *E05B 77/18* | (2014.01) |
| *G07C 9/00* | (2006.01) |
| *B60R 25/24* | (2013.01) |
| *E05B 77/54* | (2014.01) |

(52) U.S. Cl.
CPC .............. *E05B 77/18* (2013.01); *B60R 25/24* (2013.01); *E05B 77/54* (2013.01); *G07C 9/00309* (2013.01)

(58) Field of Classification Search
CPC .................................. B60R 25/24; B60J 7/201
USPC .......................................................... 307/9.1
See application file for complete search history.

(56) References Cited

U.S. PATENT DOCUMENTS

| | | | | |
|---|---|---|---|---|
| 2008/0211642 A1* | 9/2008 | Harata | ............... | G07C 9/00309 340/426.28 |
| 2014/0088826 A1* | 3/2014 | Wheeler | ................. | E05B 77/54 701/36 |

FOREIGN PATENT DOCUMENTS

JP    2006-077408 A    3/2006

* cited by examiner

*Primary Examiner* — Alfonso Perez Borroto
(74) *Attorney, Agent, or Firm* — Westerman, Hattori, Daniels & Adrian

(57) ABSTRACT

A door lock system includes a trunk partitioned from a passenger compartment of a vehicle, a hood that opens and closes the trunk, a door lock mechanism that locks a door of the vehicle independently from locking of the hood, a control unit that controls driving of the door lock mechanism in response to predetermined communication performed with an electronic key carried by a user, and an opening detection unit that detects whether the hood is open. If the opening detection unit detects that the hood is open, the control unit inhibits the door lock mechanism from locking the door even when the predetermined communication is performed.

6 Claims, 2 Drawing Sheets

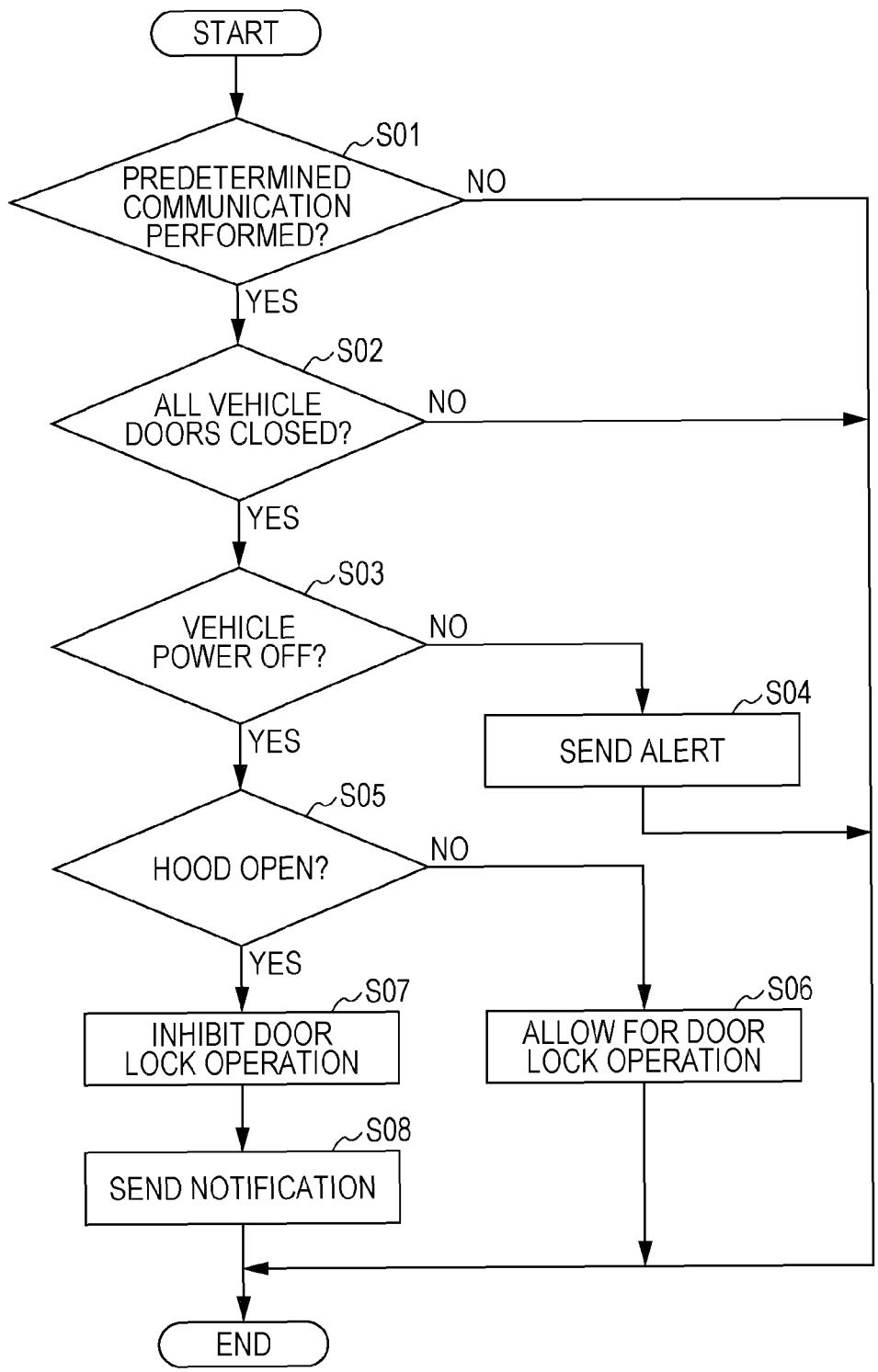

DOOR LOCK SYSTEM

CROSS REFERENCES TO RELATED APPLICATIONS

The present application claims priority under 35 U.S.C. § 119 to Japanese Patent Application No. 2014-185935, filed Sep. 12, 2014, entitled "Door Lock System." The contents of this application are incorporated herein by reference in their entirety.

TECHNICAL FIELD

The present disclosure relates to a door lock system.

BACKGROUND

A technology for electronic key systems used in vehicles has been developed. A transmitter capable of transmitting radio waves is mounted in the trunk of a vehicle, and a mobile device responds to the radio waves. If the trunk that is unlocked is locked, the transmitter transmits radio waves to the inside of the trunk (refer to, for example, Japanese Unexamined Patent Application Publication No. 2006-77408). According to this technology, upon receiving the radio waves transmitted by the transmitter, the mobile device returns a signal including identification information. Accordingly, a control unit detects that the mobile device is locked in the trunk on the basis of reception of the response from the mobile device. Upon detecting that the mobile device is not located in the passenger compartment of the vehicle and is locked in the trunk, the control unit performs an electric process (e.g., sends an alert or opens the trunk).

The above-described existing technology has the following issue. That is, if a sufficient space for disposing the transmitter is not available in the trunk, it is difficult to directly transmit radio waves to the inside of the trunk and, thus, it is difficult to determine whether a mobile device is located in the trunk. In addition, if as in MR layout vehicles, the space under the hood serves as a trunk, it is difficult to mount a pop-up mechanism for electromagnetically opening the hood due to a structural reason. A mobile device is locked in the trunk in the following situation. That is, when all the doors of the vehicle are locked and only the trunk is open and if the user closes the trunk with the mobile device left in the trunk, such a situation occurs. At that time, there is no way for the user to open the trunk. In general, a trunk is unlocked only by operating a trunk unlock lever disposed in the passenger compartment of the vehicle, operating a button of the mobile device, or operating a switch disposed outside the trunk to communicate with a regular mobile device. Thus, once the trunk is closed, the trunk cannot be opened unless the user performs any one of the above-described operations.

SUMMARY

Accordingly, the present application describes a door lock system capable of preventing an electronic key from being locked in a trunk without determining whether the electronic key is located in the trunk. In the following explanation of the exemplary embodiment, specific elements with their reference numerals are indicated by using brackets. These specific elements are presented as mere examples in order to facilitate understanding, and thus, should not be interpreted as any limitation to the accompanying claims.

To address the above-described issue, the present disclosure employs the following embodiments.

(1) A door lock system according to an embodiment of the present disclosure includes a trunk (e.g., a trunk 32 of an exemplary embodiment) completely partitioned from a passenger compartment (e.g., a passenger compartment 31 of the exemplary embodiment) of a vehicle, a hood (e.g., the hood 33 of the exemplary embodiment) that opens and closes the trunk, a door lock mechanism (e.g., a door lock unit 39 of the exemplary embodiment) that locks a door of the vehicle (e.g., a vehicle door 38 of the exemplary embodiment) regardless of whether the hood is locked, a control unit (e.g., a vehicle control unit 44 of the exemplary embodiment) that controls driving of the door lock mechanism in response to predetermined communication performed with an electronic key (e.g., an electronic key 11 of the exemplary embodiment) carried by a user, and an opening detection unit (e.g., an opening detection unit 36 of the exemplary embodiment) that detects whether the hood is open. If the opening detection unit detects that the hood is open, the control unit inhibits the door lock mechanism from locking the door that is unlocked even when the predetermined communication is performed. Since the door lock system includes the control unit, the hood can be re-opened even when the hood is closed. In this manner, even a situation in which there is a risk of locking the electronic key inside the trunk can be removed without checking whether the electronic key is inside the trunk using communication with the electronic key. Thus, an increase in the cost regarding the system configuration can be prevented. In addition, the need for a space required for a special configuration, such as a communication device that communicates with the inside of the trunk, can be eliminated. As a result, locking of an electronic key inside the trunk can be effectively prevented at low cost without the need for an additional space.

(2) The door lock system described in (1) further includes a notification unit (e.g., a speaker 40 or an indicator 41 of the exemplary embodiment) that sends a message to the outside of the vehicle. Upon inhibiting the door lock mechanism from locking the door that is unlocked, the control unit activates the notification unit. Since the door lock system includes the control unit that activates the notification unit, the door lock system can reliably let the user be aware that the door lock mechanism cannot be unlocked.

(3) The door lock system described in (2) further includes a lock sensor (e.g., the lock sensor 37 of the exemplary embodiment) disposed in the vicinity of the door of the vehicle. Upon receiving a predetermined signal transmitted when the lock sensor is operated, the electronic key returns a predetermined response signal. Upon receiving the response signal, the control unit detects that the predetermined communication is performed and activates the notification unit only when the predetermined communication is performed. In this manner, the consumption of the power of a battery mounted in the vehicle can be reduced, and the message can be effectively output.

(4) In the door lock system described in (3), the trunk is located immediately in front of the passenger compartment of the vehicle in the front-rear direction of the vehicle. The hood (e.g., a hood 33 of the exemplary embodiment) is mechanically unlockable by operating a lever (e.g., an operation lever 34 of the exemplary embodiment) disposed in the passenger compartment of the vehicle. In this manner, in the vehicles having the hood in the front section and having a space under the hood serving as the trunk, an existing structure regarding the hood need not be changed.

Accordingly, locking of an electronic key inside the trunk can be effectively prevented at low cost without the need for an additional space.

BRIEF DESCRIPTION OF THE DRAWINGS

The advantages of the disclosure will become apparent in the following description taken in conjunction with the following drawings.

FIG. 3 is a flowchart of the operation performed by the door lock system according to the exemplary embodiment of the present disclosure.

DETAILED DESCRIPTION

A door lock system according to an exemplary embodiment of the present disclosure is described below with reference to the accompanying drawings.

Figure 1:
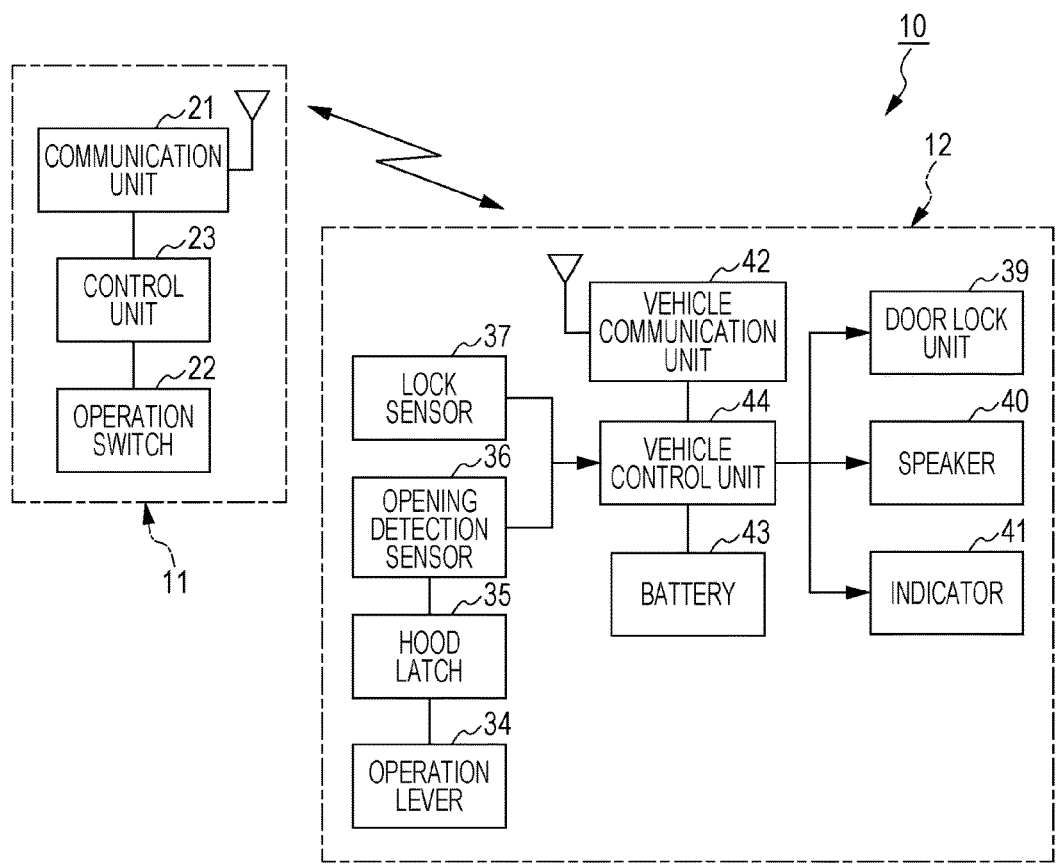
FIG. 1 is a block diagram of the configuration of a door lock system according to an exemplary embodiment of the present disclosure.

According to the present exemplary embodiment, as illustrated in FIG. 1, a door lock system 10 includes an electronic key 11 of a vehicle 1 and an in-vehicle system 12 mounted in the vehicle 1. The electronic key 11 serves as a communication terminal carried by a driver of the vehicle 1. The electronic key 11 wirelessly communicates with the in-vehicle system 12. For example, the electronic key 11 transmits a response signal in response to a request signal transmitted from the in-vehicle system 12 and a signal that instructs the operation performed by a predetermined in-vehicle device together with a unique identification information. Examples of the operation performed by the predetermined in-vehicle device include start and stoppage of a drive source (e.g., an internal-combustion engine or a motor) of the vehicle 1 and lock and unlock of a vehicle doors 38 driven by a door lock unit 39 of the vehicle 1 (described in more detail below).

The electronic key 11 includes a communication unit 21, an operation switch 22, and a control unit 23. The communication unit 21 performs wireless communication with a vehicle communication unit 42 (described in more detail below). The operation switch 22 receives an operation input by an operator and outputs a command signal that instructs the predetermined in-vehicle device to start operating.

The control unit 23 performs overall control of the operations performed by the electronic key 11. If the communication unit 21 receives a request signal transmitted from the vehicle communication unit 42, the control unit 23 determines whether the request signal is a valid request signal. If the control unit 23 determines that the request signal is a valid request signal, the control unit 23 instructs the communication unit 21 to transmit, to the vehicle communication unit 42, a response signal including the unique identification information in response to the request signal. If a command signal is output from the operation switch 22, the control unit 23 instructs the communication unit 21 to transmit the command signal to the vehicle communication unit 42.

Figure 2:
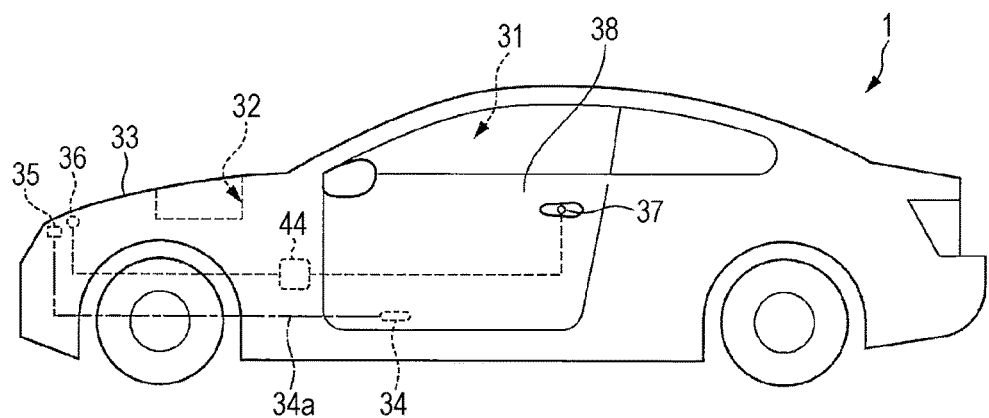
FIG. 2 is a schematic illustration of a lock sensor, an operation lever, a hood latch, and a vehicle control unit of the door lock system according to the exemplary embodiment of the present disclosure.

As illustrated in FIG. 2, the in-vehicle system 12 includes a trunk 32 completely partitioned from a passenger compartment 31 of the vehicle 1, a hood 33 that opens and closes the trunk 32, and a hood latch 35 mechanically connected to an operation lever 34, which is disposed in the passenger compartment 31, using a wire 34a. The trunk 32 is disposed immediately in front of the passenger compartment 31 of the vehicle 1 in the front-rear direction of the vehicle 1. If the operation lever 34 is not operated, the hood latch 35 mechanically holds the hood 33 so that the trunk 32 is closed. However, if the operation lever 34 is operated, the hood latch 35 mechanically unlocks and open the hood 33.

The in-vehicle system 12 includes an opening detection unit 36 that mechanically detects whether the hood 33 is open and a lock sensor 37 that outputs a command signal for instructing the door lock unit 39 to lock the vehicle door 38. The opening detection unit 36 and the lock sensor 37 are connected to a vehicle control unit 44 (described in more detail below).

The opening detection unit 36 is, for example, a mechanical switch disposed in the vicinity of the hood latch 35. The opening detection unit 36 outputs, to the vehicle control unit 44, a signal indicating that the hood 33 is open. The lock sensor 37 is, for example, a touch switch or a mechanical switch disposed in the vicinity of the vehicle door 38. The lock sensor 37 receives an operation performed by the operator and outputs, to the vehicle control unit 44, a command signal for instructing the door lock unit 39 to lock or unlock the vehicle door 38.

The in-vehicle system 12 further includes a door lock unit 39, a speaker 40, and an indicator 41. The door lock unit 39 locks or unlocks the vehicle door 38 independently from locking and unlocking of the hood 33 by the hood latch 35. The door lock unit 39 includes a door lock mechanism (not illustrated) for locking and unlocking the vehicle door 38 and a door lock actuator (not illustrated) for driving the door lock mechanism under the control of the vehicle control unit 44. The speaker 40 outputs predetermined alarm sound or a predetermined alarm voice message under the control of the vehicle control unit 44. The indicator 41 displays predetermined alarm condition under the control of the vehicle control unit 44.

The in-vehicle system 12 further includes the vehicle communication unit 42, a battery 43, and the vehicle control unit 44. The vehicle communication unit 42 wirelessly communicates with the electronic key 11. The battery 43 supplies electric power to the in-vehicle system 12.

The vehicle control unit 44 performs overall control of the in-vehicle system 12. The vehicle control unit 44 instructs the vehicle communication unit 42 to transmit a request signal to a predetermined entry area defined in a region peripheral to the vehicle door 38 outside the vehicle 1 at a predetermined timing (e.g., when all the vehicle doors 38 are closed and if the lock sensor 37 is operated). If the vehicle communication unit 42 receives a response signal transmitted from the electronic key 11 in response to the request signal, the vehicle control unit 44 determines that the predetermined communication with the electronic key 11 is performed. If the vehicle control unit 44 determines that the predetermined communication with the electronic key 11 is performed, the vehicle control unit 44 controls the door lock unit 39 in accordance with the result of detection performed by the opening detection unit 36. That is, if the opening detection unit 36 does not detect that the hood 33 is open, the vehicle control unit 44 allows the door lock unit 39 to lock the vehicle door 38. However, if the opening detection unit 36 detects that the hood 33 is open, the vehicle control unit 44 inhibits the door lock unit 39 from locking the vehicle door 38. When inhibiting the door lock unit 39 from locking the vehicle door 38, the vehicle control unit 44 outputs a message indicating that door lock of the vehicle doors 38 is inhibited using at least one of the speaker 40 and the indicator 41.

According to the present exemplary embodiment, the door lock system 10 has the above-described configurations. An example of the operation performed by the door lock system 10 is described below. The vehicle control unit 44 determines whether predetermined communication with the electronic key 11 has been performed first (step S01). If the determination is "NO", the processing performed by the vehicle control unit 44 proceeds to "END" (NO in step S01). However, if the determination is "YES", the processing performed by the vehicle control unit 44 proceeds to step S02 (YES in step S01).

Subsequently, the vehicle control unit 44 determines whether all the vehicle doors 38 of the vehicle 1 are closed (step S02). If the determination is "NO", the processing performed by the vehicle control unit 44 proceeds to "END" (NO in step S02). However, if the determination is "YES", the processing performed by the vehicle control unit 44 proceeds to step S03 (YES in step S02).

Subsequently, the vehicle control unit 44 determines whether the power source switch position of the vehicle 1 is off (step S03). If the determination is "NO", the processing performed by the vehicle control unit 44 proceeds to step S04 (NO in step S03). However, if the determination is "YES", the processing performed by the vehicle control unit 44 proceeds to step S05 (YES in step S03). The vehicle control unit 44 outputs an alert message indicating that the power source switch position of the vehicle 1 is off using at least one of the speaker 40 and the indicator 41 (step S04). Thereafter, the processing proceeds to "END".

Subsequently, the vehicle control unit 44 determines whether the hood 33 is open (step S05). If the determination is "NO", the processing performed by the vehicle control unit 44 proceeds to step S06 (NO in step S05). However, if the determination is "YES", the processing performed by the vehicle control unit 44 proceeds to step S07 (YES in step S05). At step S06, the vehicle control unit 44 allows the vehicle doors 38 to be locked. Thus, the door lock unit 39 is driven to lock the vehicle doors 38. Thereafter, the processing proceeds to "END". The vehicle control unit 44 inhibits door lock of the vehicle doors 38 (step S07). Thereafter, the vehicle control unit 44 sends a notification stating that door lock of the vehicle doors 38 is inhibited using at least one of the speaker 40 and the indicator 41 (step S08). Thereafter, the processing proceeds to "END".

When the vehicle 1 stops travelling and if, for example, the driver turns off the ignition key of the vehicle 1, opens the hood 33 by operating the operation lever 34, and gets off the vehicle 1 with the electronic key 11 in their hand, the vehicle control unit 44 inhibits control to lock the vehicle doors 38 that are unlocked. Accordingly, even when the driver operates the electronic key 11 or the lock sensor 37 to lock the vehicle doors 38, the vehicle doors 38 remain unlocked. Alternatively, even when the driver gets off the vehicle 1, closes the hood 33 with the electronic key 11 left inside the trunk 32, and operates the lock sensor 37 to lock the vehicle doors 38, the electronic key 11 does not perform the predetermined communication, since the electronic key 11 is located outside the predetermined entry area. Thus, the vehicle doors 38 remain unlocked. Since the vehicle doors 38 are unlocked, the driver can open the hood 33 by operating the operation lever 34 disposed inside the passenger compartment 31 even after the driver closes the hood 33.

As described above, according to the present exemplary embodiment, the door lock system 10 includes the vehicle control unit 44 that inhibits the vehicle doors 38 that are unlocked from being locked if the hood 33 is open. Accordingly, even when the hood 33 is closed, the hood 33 can be opened again through the operation performed on the operation lever 34 in the passenger compartment 31. In this manner, even a situation that creates a risk of locking the electronic key 11 inside the trunk 32 can be removed by using communication with the electronic key 11 without checking whether the electronic key 11 is inside the trunk 32. For example, since the need for a dedicated configuration, such as a communication device that communicates with the inside of the trunk 32 and an electrically controlled latch mechanism of the hood 33, is eliminated, an increase in the cost and the mounting space required for the system configuration can be prevented. That is, locking of an electronic key inside the trunk can be effectively prevented at low cost without the need for an additional space. Furthermore, the door lock system 10 includes the vehicle control unit 44 that outputs an alert message when locking of the vehicle doors 38 that are unlocked is inhibited. Accordingly, the door lock system 10 can reliably let the user be aware that the vehicle doors 38 cannot be locked by operating the door lock unit 39.

In addition, if it is detected that predetermined communication is performed with the electronic key 11 that receives a predetermined signal corresponding to the operation performed on the lock sensor 37, that is, only when the electronic key 11 is located in the range of radio communication and the vehicle doors 38 can be locked, a message is sent. Accordingly, the consumption of the power of the battery 43 mounted in the vehicle 1 can be reduced, and the message can be effectively sent. Furthermore, in the vehicle 1 having the hood 33 in the front section and having a space under the hood 33 serving as the trunk 32, an existing structure regarding the hood 33 and the space under the hood 33 need not be changed. Accordingly, locking of the electronic key 11 inside the trunk can be prevented at low cost without the need for an additional space.

A modification of the above-described exemplary embodiment is described below. In the above exemplary embodiment, the vehicle control unit 44 determines that the predetermined communication is performed with the electronic key 11 if the vehicle communication unit 42 has received a response signal from the electronic key 11 that received a request signal transmitted when the lock sensor 37 was operated. However, the configuration is not limited thereto. For example, when an auto lock mechanism is provided, the vehicle control unit 44 may determine that the predetermined communication is performed with the electronic key 11 if reception of the response signal by the vehicle communication unit 42 is interrupted (i.e., if the electronic key 11 is moved away from the vehicle 1 by a predetermined distance or more). If the ignition key of the vehicle 1 is turned off and all the vehicle doors 38 are closed, the vehicle control unit 44 having the auto lock mechanism transmits the request signal to the area inside of a predetermined region which is located outside the vehicle 1 at predetermined time intervals. At that time, if a mode in which the response signal transmitted from the electronic key 11 in response to the request signal is received by the vehicle communication unit 42 is changed into another mode in which the response signal is not received by the vehicle communication unit 42, the vehicle control unit 44 determines that the predetermined communication with the electronic key 11 is performed. Upon determining that the predetermined communication with the electronic key 11 is performed, the vehicle control unit 44 controls the door lock unit 39 in accordance with the result of detection performed by the opening detection unit 36. According to the present modification, even when the vehicle control unit 44 has an auto lock function, that is, a function that automatically locks the vehicle doors 38 if the electronic key 11 is moved away from the vehicle 1 by a predetermined distance or more, even a situation that creates a risk of locking the electronic key 11 inside the trunk 32 can be removed.

While the above exemplary embodiment has been described with reference to the electronic key 11 that transmits a response signal containing a unique identification information in response to the request signal transmitted from the vehicle 1, the configuration is not limited thereto. For example, the electronic key 11 need not have a function to respond to the request signal. For example, when a signal instructing the vehicle doors 38 to lock is output from the operation switch 22 of the electronic key 11 and if the signal is received by the vehicle communication unit 42 via the communication unit 21, the vehicle control unit 44 determines that the predetermined communication with the electronic key 11 is performed. In such a case, for a region including the inside and the outside of the vehicle 1, the vehicle control unit 44 defines at least a region other than the entire region of the passenger compartment 31 as a predetermined entry area and makes the determination for a signal transmitted from the electronic key 11 in the predetermined entry area. In addition, the in-vehicle system 12 may include the hood latch 35 that electrically operates. If the operation switch 22 of the electronic key 11 outputs a signal instructing the hood 33 to open (i.e., a signal instructing the trunk 32 to open) and the signal is received by the vehicle communication unit 42 via the communication unit 21, the vehicle control unit 44 may determine that the predetermined communication with the electronic key 11 is performed.

In the above-described exemplary embodiment, if the predetermined communication with the electronic key 11 is performed and the hood 33 is open, the vehicle control unit 44 inhibits door lock of the vehicle doors 38. That is, the vehicle control unit 44 inhibits control to lock the vehicle doors 38 that are unlocked. However, the control is not limited thereto. For example, the in-vehicle system 12 may include an operation member that locks and unlocks the vehicle doors 38 by mechanically driving the door lock unit 39 through the operation performed by an operator (an example of such an operation member is a door lock switch or a door lock knob disposed in the passenger compartment 31 of the vehicle 1). As the control to inhibit door lock of the vehicle doors 38, the vehicle control unit 44 may unlock the vehicle doors 38 that are locked, by driving the door lock unit 39, if the vehicle doors 38 are mechanically locked by the operation member.

While the above exemplary embodiment has been described with reference to the in-vehicle system 12 including the hood 33 for closing the trunk 32 located immediately in front of the passenger compartment 31 of the vehicle 1 in the front-rear direction of the vehicle 1, the configuration of the in-vehicle system 12 is not limited thereto. The in-vehicle system 12 may include the trunk 32 disposed in another location of the vehicle 1 and a hood that closes the trunk 32 instead of the hood 33.

It should be understood that the above-described embodiment of the present disclosure is only illustrative and it is not intended to limit the scope of the invention. The embodiment may be presented in a variety of forms. Various deletions, replacements, and changes may be made within the scope of the present disclosure. Such an embodiment and a modification thereof are encompassed within the scope and spirit of the present disclosure. In addition, the embodiment and the modification thereof are encompassed within the scope and spirit of the appended claims of the disclosure and equivalent disclosures.

What is claimed is:

1. A door lock system comprising:
   a trunk independently provided and partitioned from a passenger compartment of a vehicle;
   a hood that opens and closes the trunk;
   a door lock mechanism that locks a door of the vehicle independently from locking of the hood;
   a control unit that controls driving of the door lock mechanism in response to a predetermined communication performed with an electronic key carried by a user;
   an opening detection unit that detects whether the hood is in an open state; and
   a notification unit that sends a notice to the outside of the vehicle,
   wherein when a power switch of the vehicle is at an off position and if the opening detection unit detects that the hood is in the open sate, the control unit inhibits the door lock mechanism from switching to a locked state from an unlocked state even when the predetermined communication is performed, and if the opening detection unit detects that the hood is not in the open sate, the control unit controls the door lock mechanism to switch to the locked state from the unlocked state when the predetermined communication is performed, and
   wherein upon inhibiting the door lock mechanism from switching to the locked state from the unlocked state, the control unit activates the notification unit.

2. The door lock system according to claim 1, further comprising:
   a lock sensor disposed in the vicinity of the door of the vehicle,
   wherein upon receiving a predetermined signal transmitted when the lock sensor is operated, the electronic key returns a predetermined response signal, and
   wherein upon receiving the response signal, the control unit detects that the predetermined communication is performed and activates the notification unit only when the predetermined communication is performed.

3. The door lock system according to claim 2, wherein the trunk is located in front of the passenger compartment of the vehicle in a longitudinal direction of the vehicle, and
   wherein the hood is mechanically openable by operating a lever disposed in the passenger compartment of the vehicle.

4. A door lock system comprising:
   a trunk independently provided and partitioned from a passenger compartment of a vehicle;
   a hood that opens and closes the trunk;
   a door lock mechanism that locks a door of the vehicle independently from locking of the hood;
   a controller configure to control driving of the door lock mechanism in response to a predetermined communication performed with an electronic key carried by a user;
   an opening detector that detects whether the hood is in an open state; and
   a notification mechanism that sends a notice to the outside of the vehicle,
   wherein when a power switch of the vehicle is at an off position and if the opening detector detects that the hood is in the open state, the controller inhibits the door lock mechanism from locking the door even when the predetermined communication is performed, and if the opening detector detects that the hood is not in the open state, the controller controls the door lock mechanism to lock the door when the predetermined communication is performed, and wherein upon inhibiting the door lock mechanism from locking the door, the controller activates the notification mechanism.

5. The door lock system according to claim 4, further comprising:

a lock sensor disposed in the vicinity of the door of the vehicle, wherein upon receiving a predetermined signal transmitted when the lock sensor is operated, the electronic key returns a predetermined response signal, and wherein upon receiving the response signal, the controller detects that the predetermined communication is performed and activates the notification mechanism only when the predetermined communication is performed.

6. The door lock system according to claim 5, wherein the trunk is located in front of the passenger compartment of the vehicle in a longitudinal direction of the vehicle, and wherein the hood is mechanically openable by operating a lever disposed in the passenger compartment of the vehicle.

* * * * *